United States Patent Office 3,122,726
Patented Feb. 25, 1964

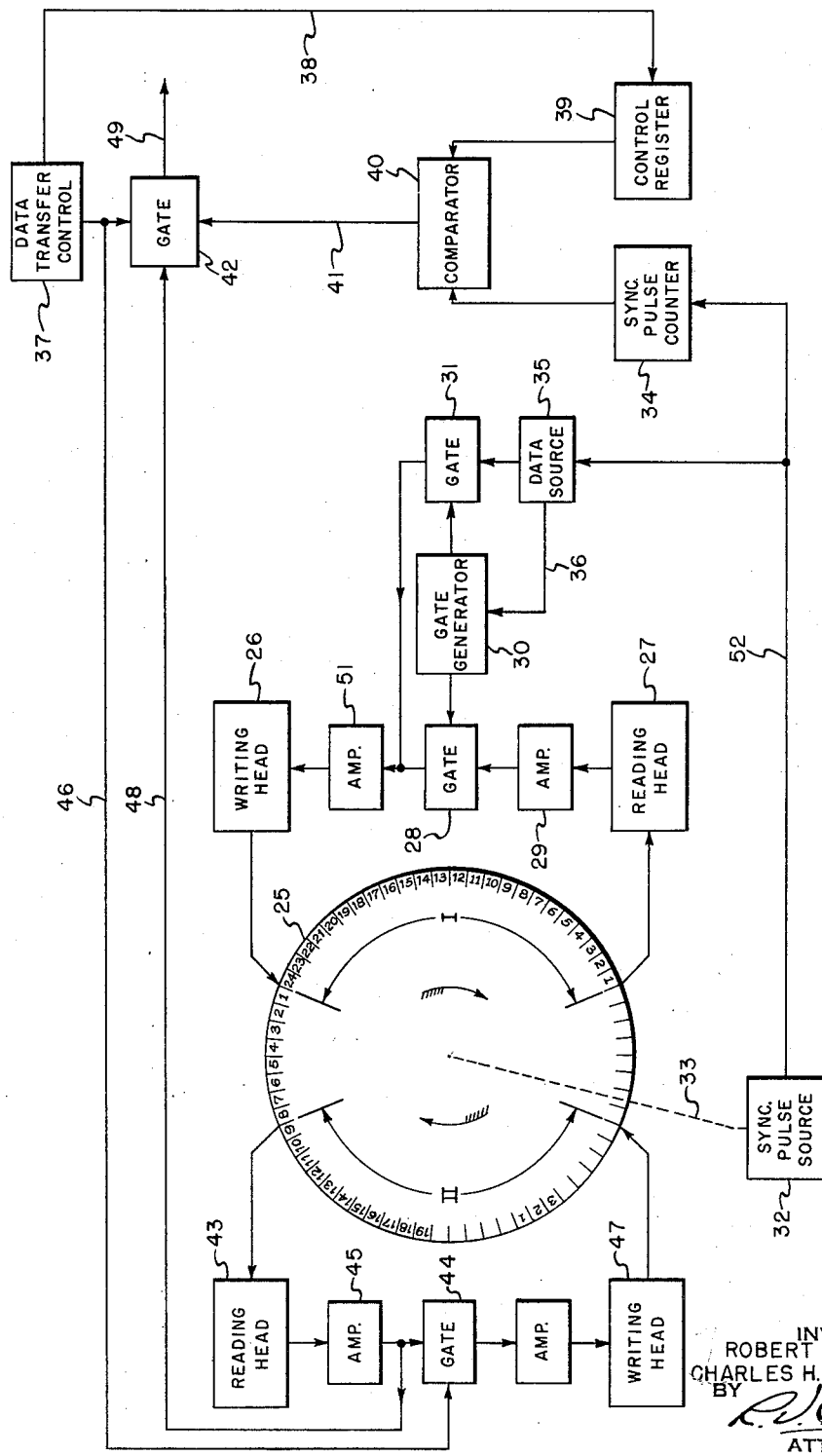

3,122,726
RECIRCULATING BINARY DATA RATE
CONVERTER
Robert W. King, Jr., and Charles H. Doersam, Jr., Port
Washington, N.Y., assignors to Sperry Rand Corporation, a corporation of Delaware
Filed Jan. 2, 1958, Ser. No. 706,859
3 Claims. (Cl. 340—174.1)

The present invention relates to data rate converters and, more particularly, to a simplified and improved binary data rate converter adapted to receive and store input digital data and operative to transmit the stored data at a rate which may be substantially unrelated to that of the input data.

One of the problems commonly encountered in digital data handling systems arises from the fact that data generation rates are generally different from data utilization rates. Many solutions have been proposed to this prior art problem including those which use magnetic storage drum data rate converters. The usual drum technique involves the storage of data at respective and predetermined locations along the drum circumference. For purposes of bringing the value of the respective stored data up to date, means are provided which program the insertion of the latest data into their respective predetermined drum locations. Then, upon the occurrence of a control signal, the stored data is "read out" from the storage drum and made available to a data utilization device.

One of the disadvantages inherent in the employment of the above technique is that the drum storage device must be rendered insensitive to any input data which is received during the "read-out" interval. Thus, the information received during such interval is completely lost.

To avoid the loss of information during the read-out interval, other schemes have been proposed which generally include the use of two independent storage devices—a first for receiving and storing the input data, and the second for storing the same data until a read-out signal is received, whereupon the data stored in the second storage device is transmitted to an appropriate utilization means. The resulting duplication of the storage and associated programming apparatus seriously detracts from the advantages incident to simultaneously receiving and making available digital data.

It is the principal object of the present invention to provide an improved and simplified digital data storage means adapted to receive and store digital data and operative to make the stored data available at a rate substantially independent of that of the received data.

Another object is to provide buffer storage means for digital data including first and second digital data storage means selectably connectable to each other in a first mode of operation and adapted to be completely isolated from each other in a second mode of operation.

A further object is to provide buffer storage means for digital data adapted to simultaneously receive and store input data and to transmit up-to-date values of said stored data.

These and other objects of the present invention, as will appear more fully upon a reading of the following specification, are accomplished by the provision of first and second digital data storage means selectably connectable to each other. The first storage means is adapted to receive and store signals representing newly generated data. The second storage means, when connected to the first storage means, stores signals representing the same data.

Upon the occurrence of a read-out control signal, the second means is disconnected from the first storage means and then stores for an indefinite period those signals representing the last-stored data. Signals representing the data stored in the second means may then be made available at a rate determined by the requirements of the data utilization device.

In a preferred embodiment of the present invention, the first and second storage means are each respective selectably recirculating portions of a common magnetic drum storage track. Each track portion is equipped with a writing and a reading head. The writing and reading heads associated with the first or input portion of the storage track are disconnected from each other when data is being received and connected to each other in the absence of received data thus recirculating the existing data in the latter case. The reading and writing heads associated with the second or output portion of the common storage track are disconnected from each other except when the output data is required by the data utilization device. Upon the occurrence of a read-out signal as generated by the data utilization device, the reading and writing heads of the output portion of the storage track are connected to each other whereby the information then contained in the output portion of the track is recirculated and stored therein for an indefinite period for transmittal to the utilization device in accordance with its requirements for data.

For a more complete understanding of the present invention, reference should be had to the following specification and to the sole figure which represents in block diagram form a preferred embodiment of the present invention.

In the figure, the numeral 25 generally identifies a rotatable magnetic drum storage device. Drum 25 is divided into first and second portions represented by the Roman numerals I and II. Portions I and II are those regions of drum 25 which lie between the indicated respective pairs of reading and writing heads regardless of the angular displacement of drum 25. Each portion is further divided into a plurality of discrete sections or data positions, 24 sections being shown by way of example. As is well understood in the art, each section may be distinctively magnetized upon the application of binary valued input signals.

Such input signals are impressed on portion I by writing head 26 and are monitored by reading head 27. The output of reading head 27 is connected to gate 28 via amplifier 29 whereby reading head 27 is selectably connectable to amplifier 51 and thence to the input of writing head 26. Gate 28 is rendered conductive by a first output from gate generator 30. A second output signal produced by generator 30 is applied to the control input of gate 31. The first and second output signals from generator 30 are of opposite characteristic whereby the states of conduction of gates 28 and 31 are oppositely controlled, that is, when gate 28 is conductive, gate 31 is non-conductive, and vice versa.

By way of example, sync pulse source 32 is shown as being connected to drum 25 by mechanical shaft 33 whereby pulse source 32 produces one output pulse for each time that a respective drum section enters portion I and passes the location of writing head 26. Other alternative means for synchronizing the pulses of source 32 with the rotation of drum 25 may be used. For example, source 32 could comprise an additional track of drum 25. The pulses produced at the output of source 32 are applied via lead 52 to the inputs of sync pulse counter 34 and data source 35. Data source 35 generally represents a source of binary valued sequential signals representing respective data. It may include a digital computer, for example, some of whose operations are synchronized with the rotation of drum 25 by the pulses appearing on lead 52. The data signal output of source 35 is connected to the signal input of gate 31. A second output, derived from source 35, is applied to the control input of gate generator 30.

The second output of data source 35 produces a signal synchronized, by means of the pulses appearing on lead 52, to the rotation of drum 25 whereby gate generator 30 is energized at a time wherein a predetermined section is passing the location of writing head 26 so that data, corresponding to said predetermined section, may be properly stored thereon. Gate generator 30 may be a monostable multivibrator, for example, whose quiescent state of conduction is inverted during the presence of the second output signal on lead 36 from source 35. Upon the inversion of the state of generator 30, gate 31 is rendered conductive allowing the data from source 35 to be impressed upon its respective section of drum 25. Gate 28 is synchronously rendered non-conductive and remains so until the second output signal on lead 36 disappears, permitting generator 30 to revert to its quiescent state.

Portion II of drum 25 is divided into the same number of discrete sections as is portion I. The data stored in portion II is monitored by reading head 43 whose output is applied to gate 44 via amplifier 45. Gate 44 is normally closed, i.e., normally non-conductive except in the presence of a data control signal produced at a first output of data transfer control 37 which is applied to a first control input of gate 42 and via line 46 to gate 44. The signal input to gate 42 is derived from the output of amplifier 45. Writing head 47 is connected to the output of amplifier 45 when gate 44 is opened in the presence of a data control signal on lead 46.

The sync pulses appearing on lead 52 cause a count to be stored in counter 34 corresponding to the position of drum 25 with respect to the location of reading head 43. Thus, the number stored in counter 34 is always representative of the angular displacement of drum 25 relative to the location of reading head 43.

Data transfer control 37 produces a second output control signal on lead 38 for setting the count stored in control register 39. The signal outputs from counter 34 and register 39 are applied to a conventional binary signal comparator 40 which is operative to produce an output signal on lead 41 upon the concurrence of signals representing equal values of the counts stored in counter 34 and register 39. Assuming that a given number is inserted into control register 39, an output signal is produced on lead 41 when a predetermined section of drum 25, corresponding to said number, arrives at the location of reading head 43. The signal appearing on lead 41 is applied to a first control input of gate 42.

For purposes of explaining the operation of the apparatus of the sole figure, it is assumed that drum 25 rotates in the indicated clockwise direction. A signal representing data to be stored is produced at the first output of data source 35 at the same time that a second output signal, occurring on lead 36, is applied to the control input of gate generator 30. Gate 31 is opened and gate 28 is closed upon the operation of gate generator 30. The signal, representing the data to be stored, is then passed by gate 31 and impressed by writing head 26 on a respective and predetermined section of drum 25, passing under writing head 26 at such time. Data source 35 includes means responsive to the sync pulses on lead 52 for releasing data signals at times coinciding with respective and predetermined angular positions of drum 25 relative to that of writing head 26. Similarly, further data is impressed upon corresponding sections of drum 25 under the synchronizing control of the pulses applied via lead 52 to data source 35. In this fashion, the sections of portion I of drum 25 sequentially are filled with the data produced by source 35.

When all the desired sections of portion I of drum 25 have been filled with their respective data, the second signal appearing on lead 36 at the output of source 35 disappears whereupon gate 31 is closed and gate 28 is opened. Upon the opening of gate 28, the amplified output of reading head 27 is applied to the input of writing head 26. In the figure, the angular displacement of heads 26 and 27 relative to rotating drum 25 is such that section 1 of portion I arrives under reading head 27 at the same time that the end of section 24 is leaving writing head 26. As a result, the information stored in the first section is relayed back to writing head 26 via reading head 27 and rewritten on section 1 which immediately follows section 24. Section 2 is rewritten after section 1 and so on. By means of the recirculating memory loop comprised of drum 25, reading head 27, amplifier 29, open gate 28, amplifier 51, and writing head 26, the data originally impressed on the respective sections of portion I remains stored in portion I until such time as new data is made available by source 35. It will be recalled that portion I refers to the indicated region of rotating drum 25 which lies between the position of reading head 27 and the position of writing head 26. Thus, any given drum section is deemed to be within portion I so long as it already has passed the position of head 26 but has not yet passed the position of head 27.

As drum 25 rotates in its clockwise direction, the information previously stored in portion I passes first under writing head 47 and later under reading head 43. In the absence of a data control signal on lead 46, gate 44 is closed, disconnecting reading head 43 from writing head 47. In such an event, the data stored in the sections energizing from portion I is not obliterated on passing under writing head 47 of portion II. Consequently, said data is transmitted to portion II by the physical movement of the sections from portion I to portion II. It can be seen, therefore, that portions I and II of drum 25 each store identical data, which is the latest data made available by source 35.

When data is required by the data utilization device, a data control signal is produced on lead 46 opening gate 44, thereby connecting the output of reading head 43 to the input of writing head 47. In this case, the information in portion II of drum 25 is stored for an indefinite period in the same manner as previously described in connection with the operation of the recirculating memory loop of portion I. Furthermore, the information stored indefinitely in portion II is identical with the information stored in portion I at the time immediately prior (by one-half drum revolution) to the appearance of data control signal on lead 46. It will be observed that portion II is effectively isolated from portion I when gate 44 is opened because of the action of writing head 47 in obliterating all the data recorded on the sections passing under it in the process of recording the recirculating data on the same section. Accordingly, portion I may still receive and store new data from source 35 without affecting in any way the values of the data stored in portion II.

The output of amplifier 45 is applied via lead 48 to the signal input of gate 42, the second control input to which is derived from lead 46 at the output of control 37. Gate 42 is rendered conductive in the simultaneous presence of signals on leads 41, 46, and 48, whereby signal appearing on lead 48 is made available at output lead 49. Thus, the information stored in a predetermined section of portion II, corresponding to the number stored in register 39, is made available to a data utilization device (not shown) in the form of a signal on lead 49 when said predetermined section passes the location of reading head 43 in the presence of a data control signal on lead 46.

Data stored in any other predetermined section of portion II may be obtained by merely changing the number inserted in control register 39.

It will be appreciated that although the first and second storage means of the present invention are shown in the preferred embodiment of FIG. 1 as comprising selectably recirculating portions of a common magnetic drum storage track, other alternative serial information storage (recirculating) derives such as sonic or ultrasonic delay lines, and the like may be substituted in lieu thereof within the purview of the present invention.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus comprising first and second mutually exclusive portions of the same serial digital signal delay means, said portions being mutually exclusive in the sense that there is no part of said delay means that is shared in common by both portions, each portion having a signal input and a signal output transducer, first actuable means for connecting when actuated the input transducer of said first portion to the output transducer thereof whereby to form a first recirculating serial digital signal storage means, second actuable means for connecting when actuated the input transducer of said second portion solely to the output transducer thereof whereby to form a second recirculating serial digital signal storage means, a source of serial digital data signals, means for selectively connecting said source to the input transducer of said first portion, first means for actuating said selectively connecting means and said first actuable means at mutually exclusive times, and second means for selectively deactuating said second actuable means whereby to deenergize the input transducer of said second portion and permit the flow of serial digital signals from said first portion to said second portion via said delay means.

2. Apparatus comprising first and second mutually exclusive portions of the same magnetic storage track, said portions being mutually exclusive in the sense that there is no part of said storage track that is shared in common by both portions, each portion having a serial digital signal input and a serial digital signal output transducer, means for moving said storage track relative to said transducers, first actuable means for connecting when actuated the input transducer of said first portion to the output transducer thereof whereby to form a first recirculating serial digital signal storage means, second actuable means for connecting when actuated the input transducer of said second portion solely to the output transducer thereof whereby to form a second recirculating serial digital signal storage means, a source of serial digital data signals, means for selectively connecting said source to the input transducer of said first portion, first means for actuating said selectively connecting means and said first actuable means at mutually exclusive times, and second means for selectively deactuating said second actuable means whereby to deenergize the input transducer of said second portion and permit the flow of serial digital signals from said first portion to said second portion via said storage track.

3. Apparatus comprising first and second mutually exclusive portions of a single track of a magnetic drum, said portions being mutually exclusive in the sense that there is no part of said drum that is shared in common by both portions, each portion being defined by the distance separating a respective pair of reading and writing heads displaced along said drum track, means for rotating said drum track relative to said heads, first actuable means for connecting when actuated the writing head of said first portion to the reading head thereof whereby to form a first recirculating storage means, second actuable means for connecting when actuated the writing head of said second portion solely to the reading head thereof whereby to form a second recirculating storage means, a source of digital data signals, means for selectively connecting said source to the writing head of said first portion, first means for actuating said selectively connecting means and said first actuable means at mutually exclusive times, and second means for selectively deactuating said second actuable means whereby to deenergize the writing head of said second portion and permit the flow of digital data signals from said first portion to said second portion via said single track of said magnetic drum.

References Cited in the file of this patent

UNITED STATES PATENTS

| | | |
|---|---|---|
| 2,617,704 | Mallina | Nov. 11, 1952 |
| 2,770,797 | Hamilton et al. | Nov. 13, 1956 |
| 2,803,515 | Begun | Aug. 20, 1957 |
| 2,845,609 | Newman et al. | July 29, 1958 |
| 2,954,166 | Eckdahl et al. | Sept. 27, 1960 |